United States Patent
Shimazu et al.

(10) Patent No.: US 7,537,543 B2
(45) Date of Patent: May 26, 2009

(54) SPEED CHANGE CONTROL DEVICE FOR BELT TYPE CONTINUOUSLY VARIABLE TRANSMISSION

(75) Inventors: Takamitsu Shimazu, Machida (JP); Yoshichika Hagiwara, Machida (JP)

(73) Assignee: JATCO Ltd, Shizuoka (JP)

( * ) Notice: Subject to any disclaimer, the term of this patent is extended or adjusted under 35 U.S.C. 154(b) by 342 days.

(21) Appl. No.: 11/604,707

(22) Filed: Nov. 28, 2006

(65) Prior Publication Data
US 2007/0123385 A1    May 31, 2007

(30) Foreign Application Priority Data
Nov. 30, 2005    (JP)    ............... 2005-346082

(51) Int. Cl.
*F16H 61/662*    (2006.01)
(52) U.S. Cl. ............... 477/48; 477/44; 477/45
(58) Field of Classification Search ............ 477/44, 477/45, 46, 47, 48, 49
See application file for complete search history.

(56) References Cited

U.S. PATENT DOCUMENTS

| | | | |
|---|---|---|---|
| 5,145,465 A | | 9/1992 | Hendriks |
| 5,439,424 A | * | 8/1995 | Sawada et al. ............ 477/46 |
| 5,971,876 A | * | 10/1999 | Spiess et al. ............ 474/28 |
| 6,443,871 B2 | * | 9/2002 | Taniguchi et al. ............ 477/44 |
| 6,849,030 B2 | * | 2/2005 | Yamamoto et al. .......... 477/159 |
| 7,267,632 B2 | * | 9/2007 | Ochiai et al. ............ 477/45 |
| 2004/0127332 A1 | * | 7/2004 | Kang et al. ............ 477/45 |
| 2006/0063641 A1 | * | 3/2006 | Oshita et al. ............ 477/44 |
| 2007/0219048 A1 | * | 9/2007 | Yamaguchi ............ 477/109 |

FOREIGN PATENT DOCUMENTS

| | | |
|---|---|---|
| JP | 4-211761 A | 8/1992 |
| JP | 10-169481 A | 6/1998 |
| JP | 2001-311463 | 11/2001 |
| JP | 2004-183854 | 7/2004 |

* cited by examiner

*Primary Examiner*—Sherry L Estremsky
*Assistant Examiner*—Justin Holmes
(74) *Attorney, Agent, or Firm*—Foley & Lardner LLP

(57) ABSTRACT

When a throttle is substantially fully open and startup is not underway, a CVT control unit (20) controls a speed ratio in accordance with a fully open speed change line. When the throttle is substantially fully open and startup is underway, the CVT control unit (20) controls the speed ratio in accordance with a fully open startup speed change line. When the throttle is substantially fully open, startup is underway, and the number of times the primary pulley rotation speed exceeds a belt assurance upper limit value exceeds an assurance frequency number, the CVT control unit (20) controls the speed ratio in accordance with the full throttle speed change line instead of the full throttle startup speed change line, even though the throttle is substantially fully open and vehicle startup is underway.

9 Claims, 5 Drawing Sheets

SPEED CHANGE CONTROL DEVICE FOR BELT TYPE CONTINUOUSLY VARIABLE TRANSMISSION

FIELD OF THE INVENTION

This invention relates to speed change line switching control performed during startup in a speed change control device for a belt type continuously variable transmission.

BACKGROUND OF THE INVENTION

A belt type continuously variable transmission in which the rotation speed of an input shaft connected to a drive source is varied continuously and transmitted to an output shaft is known. A belt type continuously variable transmission is constituted by a primary pulley, a secondary pulley, and a belt wrapped around the pulleys, and by varying the width of each pulley, the contact radius between the belt and the pulley is varied, leading to variation in a speed ratio.

JP2004-183854A published by the Japan Patent Office describes a technique for performing this type of speed change control in which a map of speed change lines defining the relationship between vehicle speed, throttle opening, and input shaft rotation speed is stored in advance, and a target speed ratio is calculated on the basis of the driving conditions by referring to this map.

SUMMARY OF THE INVENTION

The acceleration performance of a vehicle during startup at full throttle improves steadily as an upper limit value of a primary rotation speed on a speed change line which is referred to when the throttle is fully open increases. Hence, the upper limit value of the primary rotation speed on the speed change line used during startup at full throttle may be set higher than the upper limit value of the primary rotation speed on a speed change line used during acceleration at full throttle.

However, in a belt type continuously variable transmission, an upper limit value of the rotation speed at which the strength of the belt can be assured is set, and if a state in which the rotation speed is increased beyond this upper limit value to improve the acceleration performance during startup at full throttle occurs repeatedly, the belt may be damaged.

It is an object of this invention to improve the acceleration performance during startup at full throttle while preventing damage to the belt of a belt type continuously variable transmission.

In order to achieve the above object, this invention provides a speed change control device for a continuously variable transmission in which a belt is wrapped around a primary pulley into which an output of an engine is input and a secondary pulley connected to an output side of a drive system of a vehicle, and a rotation speed of the engine is varied continuously and output. The device comprising a controller which controls a speed ratio in accordance with a first speed change line when a throttle opening is substantially fully open and a vehicle accelerates during running, and controlling the speed ratio in accordance with a second speed change line, in which an upper limit value of a primary pulley rotation speed is set higher than an upper limit value of the primary pulley rotation speed on the first speed change line, when the throttle opening is substantially fully open and the vehicle starts from standstill, counts a number of times the primary pulley rotation speed exceeds a first predetermined rotation speed, which is higher than the upper limit value of the primary pulley rotation speed on the first speed change line, when the throttle opening is substantially fully open and the vehicle starts from standstill, and controls the speed ratio in accordance with the first speed change line instead of the second speed change line, even when the throttle opening is substantially fully open and the vehicle starts from standstill, after a counted value exceeds an assurance frequency number, which is a number at which a strength of the belt can be assured.

According to this invention, when the number of times the primary rotation speed enters a reachable high rotation speed region during startup at full throttle exceeds a limit (assurance frequency number) at which the strength of the belt can be assured, the speed change line is switched to prevent the primary rotation speed from entering the high rotation speed region, and hence the acceleration performance during startup at full throttle can be improved while preventing damage to the belt.

The details as well as other features and advantages of this invention are set forth in the remainder of the specification and are shown in the accompanying drawings.

DESCRIPTION OF THE PREFERRED EMBODIMENTS

Figure 1:
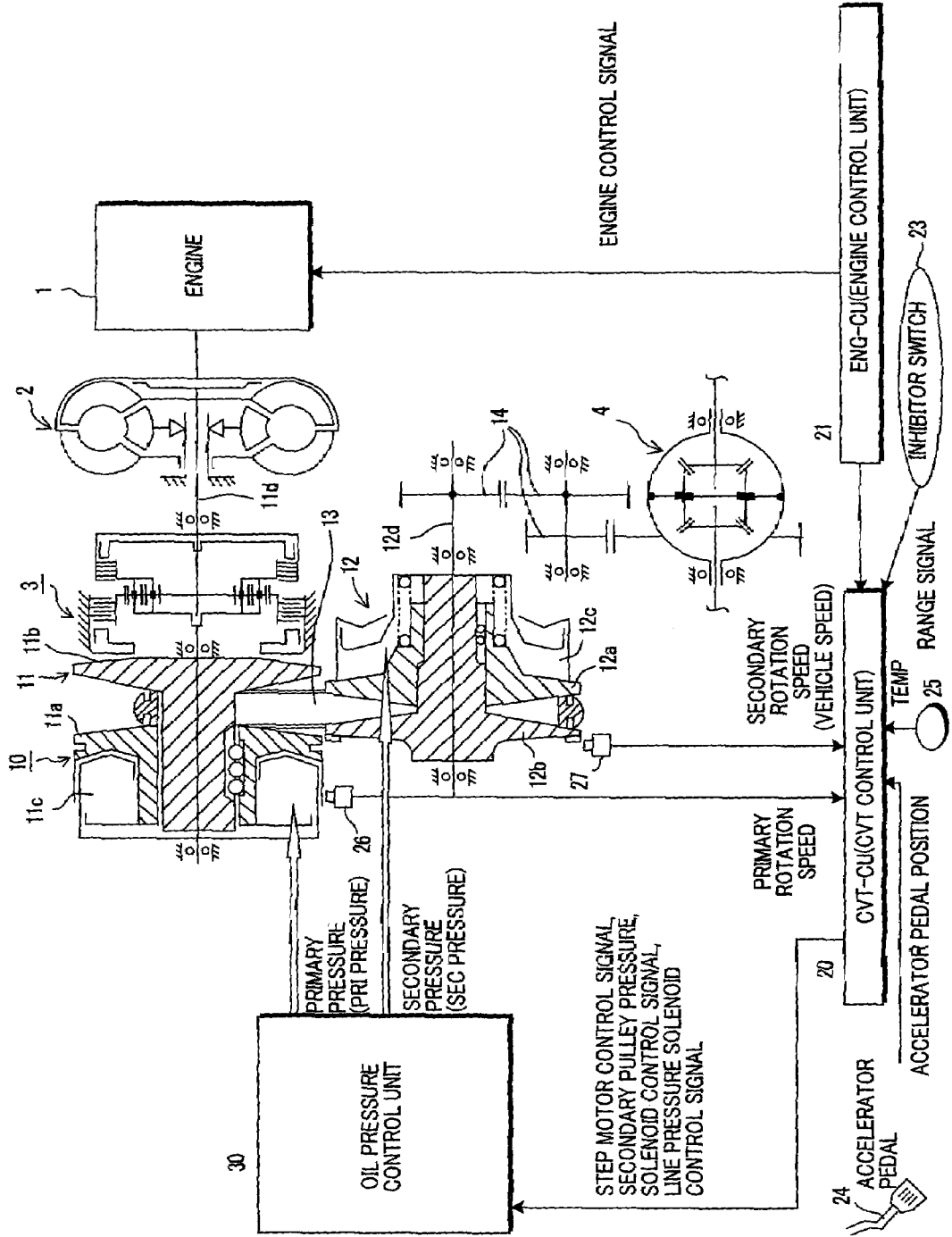
FIG. 1 is a schematic diagram showing a speed change control device for a belt type continuously variable transmission according to an embodiment.

An embodiment of this invention will be described in detail below with reference to the drawings and so on. FIG. 1 is a schematic diagram showing a line pressure control device for a belt type continuously variable transmission according to this embodiment. A belt type continuously variable transmission 10 comprises a primary pulley 11, a secondary pulley 12, a V belt 13, a CVT control unit 20 (CVTCU hereafter), and an oil pressure control unit 30, and performs a speed change operation using a line pressure as a source pressure.

The primary pulley 11 is an input shaft side pulley which inputs the rotation of an engine 1 into the belt type continuously variable transmission 10. The primary pulley 11 comprises a fixed conical plate 11b which rotates integrally with an input shaft 11d, and a movable conical plate 11a which is disposed opposite the fixed conical plate 11b to form a V-shaped pulley groove, and which can be displaced axially by oil pressure acting on a primary pulley cylinder chamber 11c. The primary pulley 11 is connected to the engine 1 via a forward-reverse switching mechanism 3 and a torque converter 2 comprising a lockup clutch, and inputs the rotation of the engine 1. The rotation speed of the primary pulley 11 is detected by a primary pulley rotation speed sensor 26.

The belt 13 is wrapped around the primary pulley 11 and secondary pulley 12 such that the rotation of the primary pulley 11 is transmitted to the secondary pulley 12.

The secondary pulley 12 outputs the rotation transmitted by the belt 13 to a differential 4. The secondary pulley 12 comprises a fixed conical plate 12b which rotates integrally with an output shaft 12d, and a movable conical plate 12a which is disposed opposite the fixed conical plate 12b to form a V-shaped pulley groove, and which can be displaced axially in accordance with oil pressure acting on a secondary pulley cylinder chamber 12c. It should be noted that a pressure-receiving surface area of the secondary pulley cylinder chamber 12c is set substantially equally to the pressure-receiving surface area of the primary pulley cylinder chamber 11c.

The secondary pulley 12 is connected to the differential 4 via an idler gear 14 and an idler shaft, and outputs the rotation to the differential 4. The rotation speed of the secondary pulley 12 is detected by a secondary pulley rotation speed sensor 27. The vehicle speed may be calculated from the rotation speed of the secondary pulley 12.

By referring to a pre-stored speed change line, the CVTCU 20 determines the speed ratio (a value obtained by dividing the effective radius of the secondary pulley 12 by the effective radius of the primary pulley 11) and a contact frictional force on the basis of signals from an inhibitor switch 23, an accelerator position sensor 24, an oil temperature sensor 25, the primary pulley rotation speed sensor 26, the secondary pulley rotation speed sensor 27, and so on, as well as input torque information from an engine control unit 21, and controls the belt type continuously variable transmission 10 by transmitting commands to the oil pressure control unit 30.

The oil pressure control unit 30 operates on the basis of the commands from the CVTCU 20. The oil pressure control unit 30 supplies the primary pulley 11 and secondary pulley 12 with oil pressure, thereby causing the movable conical plate 11a and the movable conical plate 12a to reciprocate in a rotary axis direction.

When the movable conical plate 11a and the movable conical plate 12a move, the pulley groove width varies. As a result, the belt 13 moves over the primary pulley 11 and secondary pulley 12. Thus the contact radius of the belt 13 relative to the primary pulley 11 and secondary pulley 12 varies, whereby the speed ratio and the contact frictional force of the belt 13 are controlled.

The rotation of the engine 1 is input into the belt type continuously variable transmission 10 via the torque converter 2 and the forward-reverse switching mechanism 3, and transmitted from the primary pulley 11 to the differential 4 via the belt 13 and secondary pulley 12.

When the accelerator pedal is depressed or a shift change is performed in a manual mode, the movable conical plate 11a of the primary pulley 11 and the movable conical plate 12a of the secondary pulley 12 are axially displaced, thereby varying the contact radius thereof with the belt 13 such that the speed ratio is varied continuously.

The speed ratio is determined on the basis of a map, on which a speed change line showing the relationship between the vehicle speed and the primary rotation speed is prepared for each throttle opening, by looking up a primary rotation speed corresponding to the vehicle speed and the throttle opening.

A speed change range comprises a D range having a normal speed change pattern and a Ds range in which the speed ratio is set slightly higher than that of the D range. The D range and Ds range may be switched by an operation of a shift lever performed by a driver.

An object of this embodiment is to improve the acceleration performance of the vehicle during startup at full throttle, and hence when the Ds range is selected to achieve an improved acceleration performance, the speed change line used during fully open periods is switched to a speed change line used only during startup. This will now be described using FIG. 2.

Figure 2:
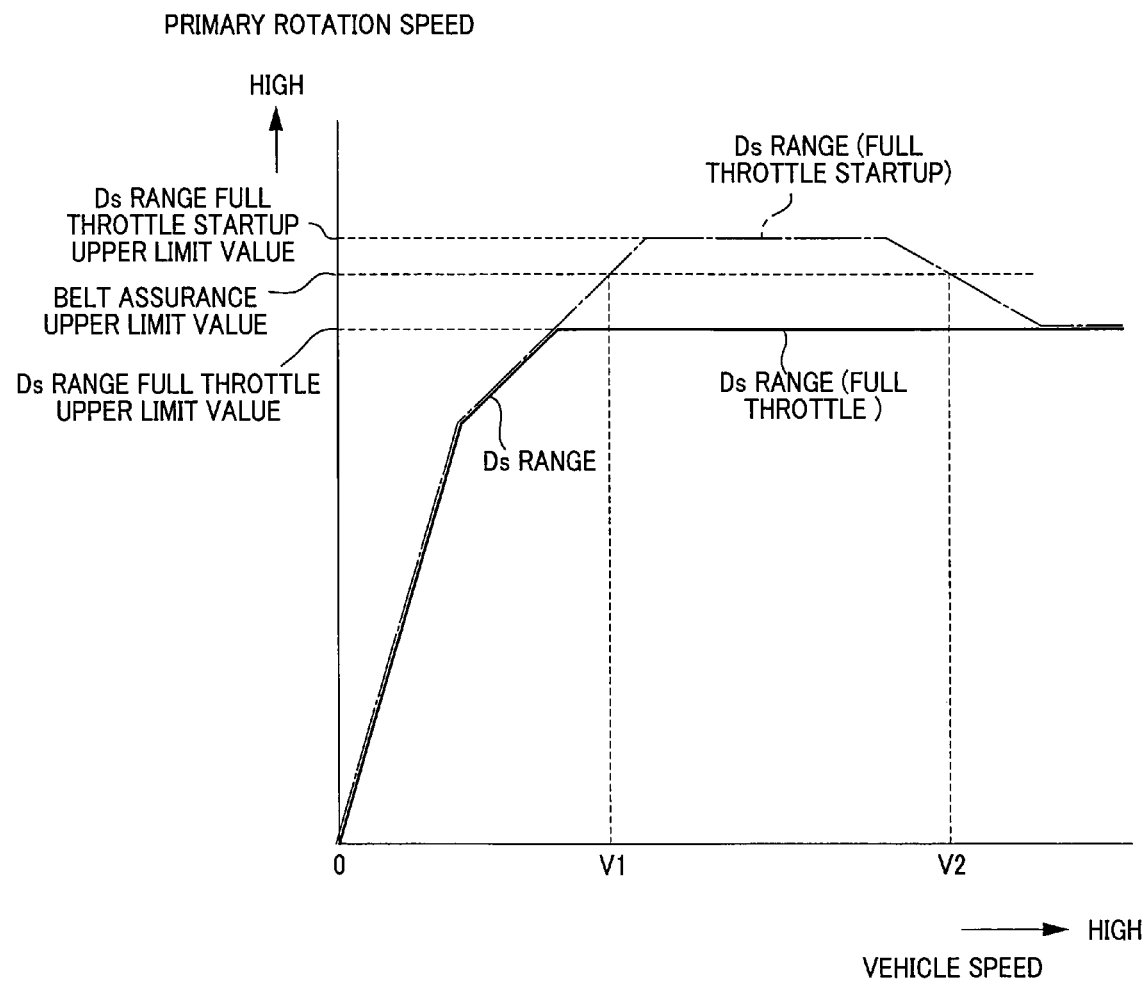
FIG. 2 is a map showing a speed change line used during fully open periods and a speed change line used during startup at full throttle in a Ds range.

FIG. 2 is a map showing the speed change line used during acceleration at full throttle and the speed change line used during startup at full throttle in the Ds range, according to this embodiment. When the driver depresses the accelerator pedal from a vehicle speed of zero such that startup at full throttle is performed, the rotation speed of the primary pulley 11 (to be referred to as the "primary rotation speed" hereafter) and the vehicle speed increase along the full throttle speed change line of the Ds range. Thereafter, when a throttle opening is fully open and a vehicle accelerates during running, the primary rotation speed only rises to a normal upper limit value along the full throttle speed change line (first speed change line), but when the throttle opening is substantially fully open and the vehicle starts from standstill, the primary rotation speed rises to a startup upper limit value along the full throttle startup speed change line (second speed change line).

Here, the upper limit value of the primary rotation speed during normal periods (other than startup at full throttle) in the Ds range (Ds range full throttle upper limit value) is set to a lower value than an upper limit value of the rotation speed at which the strength of the belt 13 can be assured (to be referred to as the "belt assurance upper limit value" hereafter), while the upper limit value of the primary rotation speed during startup at full throttle (Ds range full throttle startup upper limit value) is set to a higher value than the belt assurance upper limit value. The vehicle speed when the primary rotation speed exceeds the belt assurance upper limit value is V1, and the vehicle speed when the primary rotation speed falls below the belt assurance upper limit value is V2.

Figure 3:
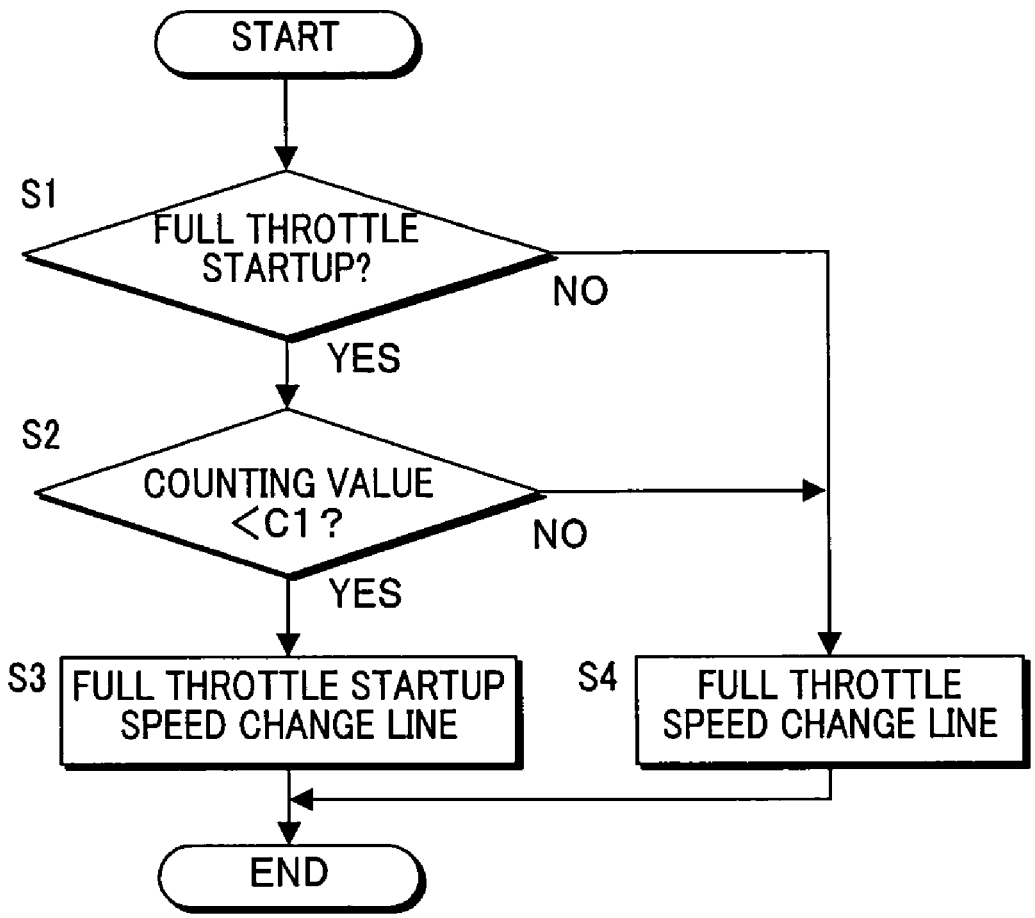
FIG. 3 is a flowchart showing speed change line switching control in the speed change control device for a belt type continuously variable transmission, according to this embodiment.
Figure 4:
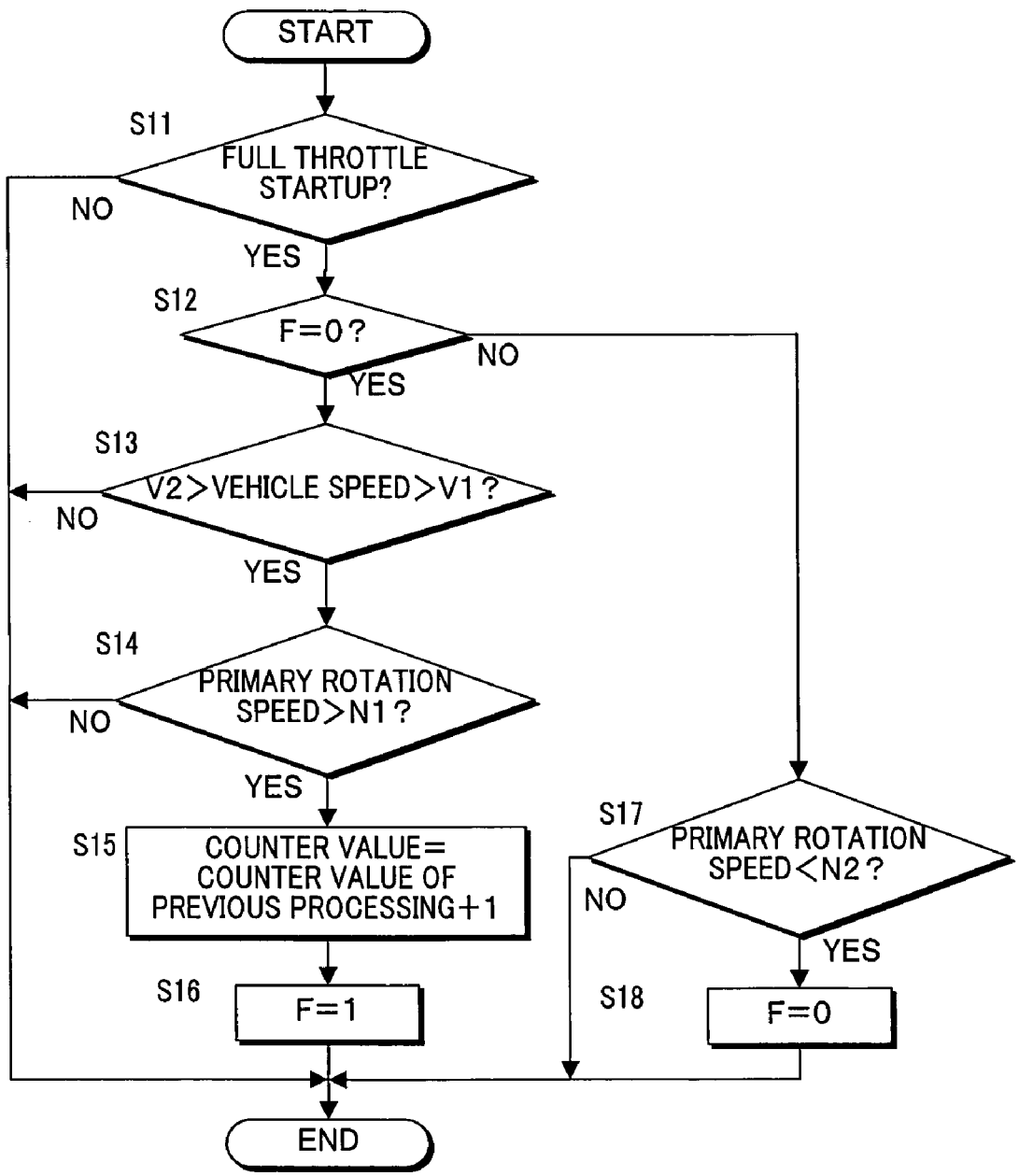
FIG. 4 is a flowchart showing counting control in the speed change control device for a belt type continuously variable transmission, according to this embodiment.

The control performed by the CVTCU 20 (speed change control means) will now be described referring to the flowcharts in FIGS. 3 and 4. FIG. 3 is a flowchart showing speed change line switching control in the speed change control device for a belt type continuously variable transmission, according to this embodiment. FIG. 4 is a flowchart showing counting control in the speed change control device for a belt type continuously variable transmission, according to this embodiment. It should be noted that the flowcharts in FIGS. 3 and 4 are both executed when the Ds range has been selected and the throttle is fully open. Further, the control of FIGS. 3 and 4 is performed repeatedly at short time intervals (of 10 msec, for example).

First, referring to FIG. 3, speed change line switching control will be described. In a step S1, a determination is made as to whether or not startup at full throttle is underway. When startup at full throttle is underway, the routine advances to a step S2, and when startup at full throttle is not underway, the routine advances to a step S4. Startup at full throttle is a state in which the vehicle begins to advance when the throttle is fully open and the vehicle speed is zero, and the throttle is kept fully open. Startup at full throttle does not include cases in which the throttle opening is reduced during traveling or cases in which the throttle is fully opened during traveling. In other words, it is determined that startup at full throttle is underway when a condition whereby the vehicle speed is equal to or lower than a predetermined speed, a condition whereby the throttle opening is equal to or greater than a predetermined opening, and a condition whereby the throttle opening remains equal to or greater than the predetermined opening thereafter, are satisfied.

In the step S2, a determination is made as to whether or not a counter value is smaller than a predetermined value C1 (assurance frequency number). When the counter value is smaller than the predetermined value C1, the routine advances to a step S3, and when the counter value is equal to or larger than the predetermined value C1, the routine advances to the step S4. The predetermined value C1 is determined in advance through experiment or the like in consideration of the durability of the belt 13.

In the step S3, speed change control is performed using the full throttle startup speed change line.

In the step S4, speed change control is performed using the full throttle speed change line.

Next, referring to FIG. 4, counting control will be described. In a step S11, a determination is made as to whether or not startup at full throttle is underway. When startup at full throttle is underway, the routine advances to a step S12, and when startup at full throttle is not underway, the processing is terminated. An identical method to that of the step S1 in FIG. 3 is used to determine whether or not startup at full throttle is underway.

In the step S12, a determination is made as to whether a high rotation flag F, which indicates that the primary rotation speed is comparatively high after the counter has been incremented, is at zero or not. When the high rotation flag F is at zero, the routine advances to a step S13, and when the high rotation flag F is not at zero, the routine advances to a step S17.

In the step S13, a determination is made as to whether or not the vehicle speed is higher than the predetermined value V1 and lower than the predetermined value V2. When this condition is satisfied, the routine advances to a step S14, and when the vehicle speed is equal to or lower than the predetermined value V1 or equal to or higher than the predetermined value V2, the processing is terminated. As shown in FIG. 2, the predetermined values V1 and V2 are vehicle speeds at which the full throttle startup speed change line of the Ds range and the belt assurance upper limit value intersect. In a region where the vehicle speed is higher than V1 and lower than V2, the full throttle startup speed change line of the Ds range exceeds the belt assurance upper limit value.

In the step S14, a determination is made as to whether or not the primary rotation speed is higher than a predetermined value N1 (first predetermined rotation speed). When the primary rotation speed is higher than the predetermined value N1, the routine advances to a step S15, and when the primary rotation speed is equal to or lower than the predetermined value N1, the processing is terminated. The predetermined value N1 is set at the belt assurance upper limit value described with reference to FIG. 2.

In the step S15 (counting means), 1 is added to the counter value of the previous processing. It should be noted that the initial value of the counter value is set at zero, and resetting is not performed.

In a step S16, the high rotation flag F is set at unity.

On the other hand, when the high rotation flag F is determined not to be at zero in the step S12, the routine advances to the step S17, where a determination is made as to whether or not the primary rotation speed is lower than a predetermined value N2 (second predetermined rotation speed). When the primary rotation speed is lower than the predetermined value N2, the routine advances to a step S18, where the high rotation flag F is set at zero. When the primary rotation speed is equal to or higher than the predetermined value N2, the processing is terminated. The predetermined value N2 is smaller than the predetermined value N1, and is used to determine that the primary rotation speed has decreased below the belt assurance upper limit value after exceeding this upper limit value during startup at full throttle in the Ds range. By performing the processing of this step, a situation in which the primary rotation speed varies repeatedly in the vicinity of the belt assurance upper limit value such that counting is performed numerous times during a single startup can be prevented.

When the counter value equals or exceeds the predetermined value C1 following repeated execution of the control described above, speed change control is performed using the non-startup full throttle speed change line even when startup at full throttle is underway, as shown in the flowchart of FIG. 3.

Figure 5:
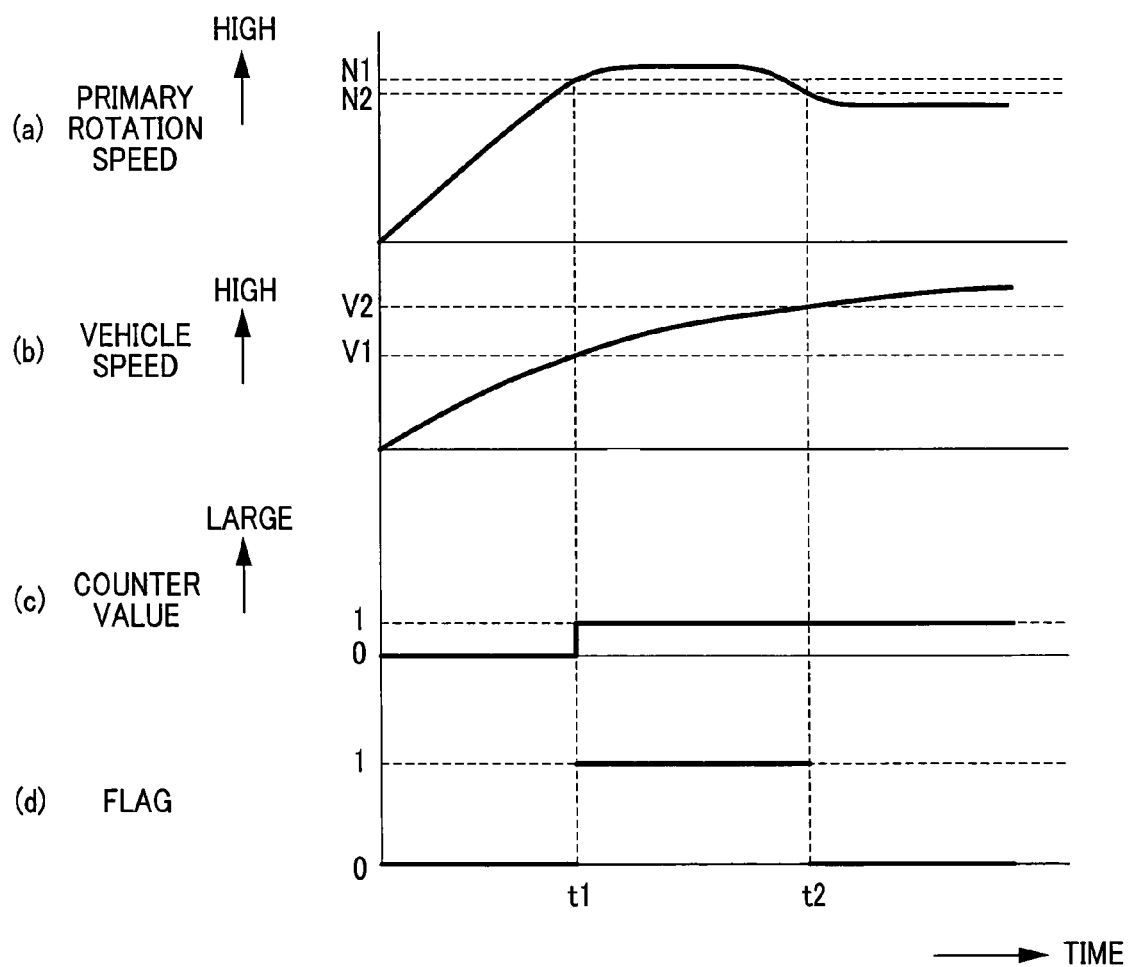
FIG. 5 is a time chart showing the actions of the speed change control device for a belt type continuously variable transmission during startup at full throttle, according to this embodiment.

Next, using FIG. 5, the actions of this embodiment will be described. FIG. 5 is a time chart illustrating the actions of the speed change control device for a belt type continuously variable transmission during startup at full throttle, according to this embodiment. In FIG. 5, (a) shows the primary rotation speed, (b) shows the vehicle speed, (c) shows the counter value, and (d) shows the flag value.

When startup at full throttle is performed in the Ds range, the primary rotation speed and vehicle speed gradually rise. At a time t1, the vehicle speed exceeds the predetermined value V1 and the primary rotation speed exceeds the predetermined value N1, and therefore the counter value is incremented and the flag is set at unity.

Thereafter, the primary rotation speed decreases as the vehicle speed rises, and at a time t2, the primary rotation speed falls below the predetermined value N2. Therefore, the flag is set at zero.

The number of times the primary rotation speed exceeds the predetermined value N1 is counted in the manner described above, and when the counter value exceeds the predetermined value C1, the full throttle startup speed change line is switched to the non-startup full throttle speed change line.

In this embodiment, as described above, when the number of times the primary rotation speed exceeds the predetermined value N1, i.e. the belt assurance upper limit value, during startup at full throttle in the Ds range is greater than the critical value C1 at which the strength of the belt 13 can be assured, the speed change line is switched such that the primary rotation speed does not exceed the predetermined value N1, and therefore the acceleration performance during startup at full throttle can be improved while preventing damage to the belt 13.

Further, a determination to switch the speed change line is made on the condition that the vehicle speed is higher than the predetermined speed V1 and lower than the predetermined speed V2, as well as the condition that the primary rotation speed exceeds the predetermined value N1 serving as the belt assurance upper limit value, and hence it is possible to determine that the primary rotation speed has exceeded the predetermined value N1 during startup at full throttle more reliably. As a result, erroneous determinations can be prevented, and a situation in which the speed change line is switched even though the strength of the belt 13 can be assured sufficiently, thereby suppressing the upper limit value of the primary rotation speed during startup at full throttle, can be prevented.

Moreover, after the counter has been incremented by 1 when the rotation speed of the primary pulley 11 exceeds the predetermined value N1 during startup, the counter is not incremented until the rotation speed falls below the predetermined value N2, and therefore a situation in which the counter is incremented excessively when the primary rotation speed varies repeatedly in the vicinity of the predetermined value N1 can be prevented. As a result, a situation in which the speed change line is switched even though the strength of the belt 13 can be assured sufficiently, thereby suppressing the upper limit value of the primary rotation speed during startup at full throttle, can be prevented.

This invention is not limited to the embodiment described above, and may be subjected to various alterations and modifications within the technical scope thereof.

This application claims priority from Japanese Patent Application 2005-346082, filed Nov. 30, 2005, which is incorporated herein by reference in its entirety.

What is claimed is:

1. A speed change control device for a continuously variable transmission in which a belt is wrapped around a primary pulley into which an output of an engine is input and a secondary pulley connected to an output side of a drive system of a vehicle, and a rotation speed of the engine is varied continuously and output, the device comprising:
a controller which
controls a speed ratio in accordance with a first speed change line when a throttle opening is substantially fully open and a vehicle accelerates during running, and controlling the speed ratio in accordance with a second speed change line, in which an upper limit value of a primary pulley rotation speed is set higher than an upper limit value of the primary pulley rotation speed on the first speed change line, when the throttle opening is substantially fully open and the vehicle starts from standstill;
counts a number of times the primary pulley rotation speed exceeds a first predetermined rotation speed, which is higher than the upper limit value of the primary pulley rotation speed on the first speed change line, when the throttle opening is substantially fully open and the vehicle starts from standstill; and
controls the speed ratio in accordance with the first speed change line instead of the second speed change line, even when the throttle opening is substantially fully open and the vehicle starts from standstill, after a counted value exceeds an assurance frequency number, which is a number at which a strength of the belt can be assured.

2. The speed change control device as defined in claim 1, wherein the controller which counts the number of times the primary pulley rotation speed exceeds the first predetermined rotation speed while a vehicle speed is within a predetermined region, when the throttle opening is substantially fully open and the vehicle starts from standstill.

3. The speed change control device as defined in claim 1, wherein the controller which performs counting when the primary pulley rotation speed exceeds the first predetermined rotation speed at startup, and then prohibits counting until the primary pulley rotation speed falls below a second predetermined rotation speed which is lower than the first predetermined rotation speed.

4. A speed change control method for a continuously variable transmission in which a belt is wrapped around a primary pulley into which an output of an engine is input and a secondary pulley connected to an output side of a drive system of a vehicle, and a rotation speed of the engine is varied continuously and output, the method comprising:
controlling a speed ratio in accordance with a first speed change line when a throttle opening is substantially fully open and a vehicle accelerates during running, and controlling the speed ratio in accordance with a second speed change line, in which an upper limit value of a primary pulley rotation speed is set higher than an upper limit value of the primary pulley rotation speed on the first speed change line, when the throttle opening is substantially fully open and the vehicle starts from standstill;
counting a number of times the primary pulley rotation speed exceeds a first predetermined rotation speed, which is higher than the upper limit value of the primary pulley rotation speed on the first speed change line, when the throttle opening is substantially fully open and the vehicle starts from standstill; and
controlling the speed ratio in accordance with the first speed change line instead of the second speed change line, even when the throttle opening is substantially fully open and the vehicle starts from standstill, after a counted value exceeds an assurance frequency number, which is a number at which a strength of the belt can be assured.

5. The speed change control method as defined in claim 4, wherein the counting counts the number of times the primary pulley rotation speed exceeds the first predetermined rotation speed while a vehicle speed is within a predetermined region, when the throttle opening is substantially fully open and the vehicle starts from standstill.

6. The speed change control method as defined in claim 4, wherein the counting performs counting when the primary pulley rotation speed exceeds the first predetermined rotation speed at startup, and then prohibits counting until the primary pulley rotation speed falls below a second predetermined rotation speed which is lower than the first predetermined rotation speed.

7. A speed change control device for a continuously variable transmission in which a belt is wrapped around a primary pulley into which an output of an engine is input and a secondary pulley connected to an output side of a drive system of a vehicle, and a rotation speed of the engine is varied continuously and output, the device comprising:
speed change control means for controlling a speed ratio in accordance with a first speed change line when a throttle opening is substantially fully open and a vehicle accelerates during running, and controlling the speed ratio in accordance with a second speed change line, in which an upper limit value of a primary pulley rotation speed is set higher than an upper limit value of the primary pulley rotation speed on the first speed change line, when the throttle opening is substantially fully open and the vehicle starts from standstill; and
counting means for counting a number of times the primary pulley rotation speed exceeds a first predetermined rotation speed, which is higher than the upper limit value of the primary pulley rotation speed on the first speed change line, when the throttle opening is substantially fully open and the vehicle starts from standstill,
wherein the speed change control means controls the speed ratio in accordance with the first speed change line instead of the second speed change line, even when the throttle opening is substantially fully open and the vehicle starts from standstill, after a value counted by the counting means exceeds an assurance frequency number, which is a number at which a strength of the belt can be assured.

8. The speed change control device as defined in claim 7, wherein the counting means counts the number of times the primary pulley rotation speed exceeds the first predetermined rotation speed while a vehicle speed is within a predetermined region, when the throttle opening is substantially fully open and the vehicle starts from standstill.

9. The speed change control device as defined in claim 7, wherein the counting means performs counting when the primary pulley rotation speed exceeds the first predetermined rotation speed at startup, and then prohibits counting until the primary pulley rotation speed falls below a second predetermined rotation speed which is lower than the first predetermined rotation speed.

* * * * *